United States Patent
Nagata et al.

(10) Patent No.: US 8,822,835 B2
(45) Date of Patent: Sep. 2, 2014

(54) TOUCH PANEL SENSOR

(71) Applicant: Nitto Denko Corporation, Ibaraki (JP)

(72) Inventors: Mizue Nagata, Ibaraki (JP); Tomotake Nashiki, Ibaraki (JP)

(73) Assignee: Nitto Denko Corporation, Ibaraki-shi (JP)

(*) Notice: Subject to any disclaimer, the term of this patent is extended or adjusted under 35 U.S.C. 154(b) by 173 days.

(21) Appl. No.: 13/654,788

(22) Filed: Oct. 18, 2012

(65) Prior Publication Data

US 2013/0098663 A1    Apr. 25, 2013

(30) Foreign Application Priority Data

Oct. 21, 2011  (JP) .................................. 2011-231969

(51) Int. Cl.
*G06F 3/044* (2006.01)

(52) U.S. Cl.
CPC ...................................... *G06F 3/044* (2013.01)
USPC ............ 174/259; 345/173; 345/176; 345/174

(58) Field of Classification Search
CPC ........ G06F 3/041; G06F 3/044; G06F 3/0488
USPC ......................................................... 174/259
See application file for complete search history.

(56) References Cited

U.S. PATENT DOCUMENTS

| 2008/0176042 A1* | 7/2008 | Nashiki et al. ................ 428/172 |
| 2010/0013798 A1* | 1/2010 | Nakajima et al. ............. 345/176 |
| 2011/0109583 A1* | 5/2011 | Lee ............................... 345/174 |

FOREIGN PATENT DOCUMENTS

JP    2011-170511 A    9/2011

* cited by examiner

*Primary Examiner* — Timothy Thompson
*Assistant Examiner* — Paul McGee, III
(74) *Attorney, Agent, or Firm* — Westerman, Hattori, Daniels & Adrian, LLP

(57) ABSTRACT

A capacitive touch panel sensor in which waviness generated in a film furnished with a transparent electrode pattern can be small. The touch panel sensor according to the present invention includes a first film, a first transparent electrode pattern formed on the first film, a first adhesive layer laminated on the first film so as to cover the first transparent electrode pattern, a second film laminated on the first adhesive layer, a second adhesive layer laminated on the second film, a third film laminated on the second adhesive layer, and a second transparent electrode pattern formed on the third film, wherein Da/Db is 0.5 to 0.9 where a total thickness of the second film and the second adhesive layer is Da, and a distance between the first transparent electrode pattern and the second transparent electrode pattern is Db.

7 Claims, 1 Drawing Sheet

Film laminate
Examples 1 to 3: second film, second adhesive layer, third film
Comparative Example: third film

TOUCH PANEL SENSOR

TECHNICAL FIELD

The present invention relates to a touch panel sensor.

BACKGROUND ART

In recent years, demands for touch panel sensors have grown significantly, and accordingly a variety of touch panel sensors have been proposed. In particular, a large number of capacitive touch panel sensors have been proposed. For example, Patent Literature 1 discloses a capacitive touch panel sensor in which a lower substrate furnished with a lower electrode pattern, a first adhesive layer, an upper substrate furnished with an upper electrode pattern, a second adhesive layer, and a surface member (also referred to as a cover lens) are laminated in this order.

CITATION LIST

Patent Literature

Patent Literature 1: JP 2011-170511A

However, such touch panel sensors have the following problems. That is, when a thin film is used as the upper substrate, waviness in some cases appears due to the difference between the shrinking behaviors of the portion with a transparent electrode and the portion without a transparent electrode. Such waviness results in, for example, a height difference of as large as about 1.5 μm between the portion with a transparent electrode and the portion without a transparent electrode when a transparent electrode pattern having a height of 30 nm is formed, and is thus problematic in that the product appearance is greatly impaired.

The present invention has been accomplished to solve the foregoing problem, and an object is to provide a capacitive touch panel sensor in which waviness generated in a film furnished with a transparent electrode pattern can be small.

SUMMARY OF INVENTION

A touch panel sensor according to the present invention includes a first film, a first transparent electrode pattern formed on the first film, a first adhesive layer laminated on the first film so as to cover the first transparent electrode pattern, a second film laminated on the first adhesive layer, a second adhesive layer laminated on the second film, a third film laminated on the second adhesive layer, and a second transparent electrode pattern formed on the third film, wherein Da/Db is 0.5 to 0.9 where a total thickness of the second film and the second adhesive layer is Da, and a distance between the first transparent electrode pattern and the second transparent electrode pattern is Db.

According to this configuration the third film on which the second transparent electrode pattern is laminated is supported by the second film via the second adhesive layer, and therefore, even when the thickness of the third film is small, waviness generated during the formation of the transparent electrode pattern can be small. Also, because Da/Db is 0.5 to 0.9 where Da is the total thickness of the second film and the second adhesive layer and Db is the distance between the first transparent electrode pattern and the second transparent electrode pattern, the distance Db can be suitably maintained even when the thickness of the third film is small, thus making it possible to enhance the touch sensitivity of the touch panel sensor. That is, it is possible to simultaneously achieve waviness reduction and touch sensitivity enhancement. Note that, when Da/Db is less than 0.5, the height difference between the portion with a transparent electrode and the portion without a transparent electrode is in some cases 0.7 μm or greater due to waviness, and such product characteristics are likely to be unacceptable.

In the touch panel sensor, Da is preferably 50 to 240 μm. Also, in the touch panel sensor, Db is preferably 100 to 300 μm.

The touch panel sensor may further include a third adhesive layer laminated on the third film so as to cover the second transparent electrode pattern and a protective layer laminated on the third adhesive layer.

According to the touch panel sensor of the present invention, waviness generated in a film furnished with a transparent electrode pattern can be small.

REFERENCE SIGNS LIST

Figure 1:
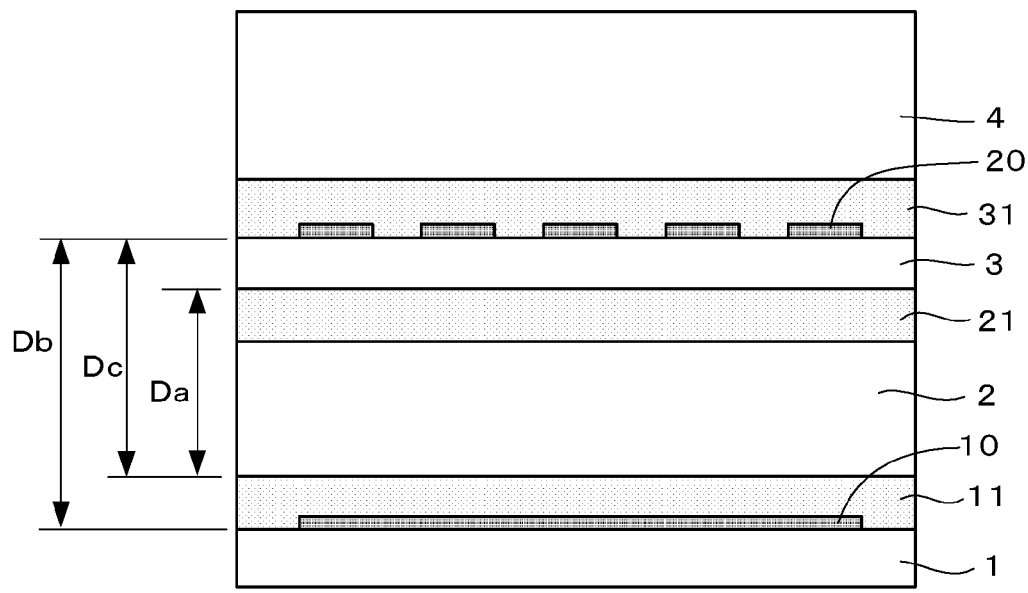
FIG. 1 is a cross-sectional view of a touch panel sensor of one embodiment of the present invention.

1 First film
11 First adhesive layer
2 Second film
21 Second adhesive layer
3 Third film
31 Third adhesive layer
10 First transparent electrode pattern
20 Second transparent electrode pattern
4 Cover lens (protective layer)

Below, an embodiment of a touch panel sensor according to the present invention will now be described with reference to the drawings. FIG. 1 is a cross-sectional view of the touch panel sensor. In the following description, the upper side in FIG. 1 is regarded as the "top" and the lower side is regarded as the "bottom" for convenience of description, but the position, orientation, and the like in which each member is disposed are not limited to this.

The touch panel sensor according to this embodiment is a sensor for use in a capacitive touch panel, and as shown in FIG. 1, three layers of film are laminated via adhesive layers. Specifically, the touch panel sensor includes a first film 1, a first transparent electrode pattern 10 formed on the first film 1, a first adhesive layer 11 laminated on the first film such that the first transparent electrode pattern 10 is embedded therein, a second film 2 laminated on the first adhesive layer 11, a second adhesive layer 21 laminated on the second film 2, a third film 3 laminated on the second adhesive layer 21, and a second transparent electrode pattern 20 formed on the third film 3. Moreover, a third adhesive layer 31 is laminated on the third film 3 such that the second transparent electrode pattern 20 is embedded therein, and a cover lens 4 is further disposed thereon.

With respect to this touch panel sensor, the dimensions may be set as follows. First, it is preferable that the total thickness Da of the second film 2 and the second adhesive layer 21 is suitably large. This is because large Da allows the third film 3 to be firmly supported, thus making it possible to reduce waviness generated during the formation of the second transparent electrode pattern 20 as described below. From this viewpoint, Da is preferably 50 to 240 μm and more preferably 55 to 200 μm. Also, it is preferable that the distance Db between the first transparent electrode pattern 10 and the second transparent electrode pattern 20 is suitably large. This is because the larger the Db, the smaller the capacitance between the transparent electrode patterns 10, 20, and as a result, a change of capacitance created when a finger touches the cover lens 4 is increased, thus making it easy to more securely detect the presence or absence of a touch. From this viewpoint, Db is preferably 100 to 300 μm and more preferably 110 to 250 μm. Note that excessively large Da and Db result in a thick touch panel sensor and are thus not suitable, and it is preferable to set Da and Db as above. Moreover, from the viewpoint of preventing waviness generated during the formation of the second transparent electrode pattern 20, a total thickness Dc of the second film 2, second adhesive layer 21, and third film 3 is preferably 75 to 250 μm and more preferably 100 to 200 μm. In regard to the foregoing Da and Db, in order to simultaneously achieve waviness reduction and touch sensitivity enhancement, Da/Db is preferably 0.5 to 0.9 and more preferably 0.6 to 0.8.

Next, the layers constituting the touch panel sensor will now be described.

(1) Films

The first and third films 1 and 3 support the first and second transparent electrode patterns 10 and 20, respectively. Their thicknesses should be small, and each preferably has a thickness of 15 to 55 μm and more preferably 20 to 30 μm. Such a small thickness provides a favorable condition for forming a transparent electrode, thus making it possible to obtain a transparent electrode pattern having excellent electrical conductivity and quality.

Also, in order to suitably maintain the distance Db between the first and second transparent electrode patterns 10, 20, it is preferable that the second film 2 is thicker than the third film. Specifically, the thickness of the second film 2 is preferably 30 to 230 μm and more preferably 40 to 200 μm. Also, from the viewpoint of touch sensitivity enhancement, the dielectric constant at 1 MHz of the second film 2 should be small and is preferably 2 to 3.

The first, second and third films 1, 2 and 3 can be formed of various materials, and it is preferable to use, for example, polyethylene terephthalate (3.2), polycycloolefin (2.3), or polycarbonate (2.9). The numerical values in the parentheses show the dielectric constants at 1 MHz of these materials. Also, it is possible to furnish one or both surfaces of the respective films 1, 2 and 3 with an easy-peel adhesive layer or a hard coat layer. Note that the materials that form the films 1, 2 and 3 may be the same or different.

(2) Transparent Electrode Patterns

The first and second transparent electrode patterns 10, 20 are sensors for sensing the location of a touch. Usually, the transparent electrode patterns 10 and 20 are each electrically connected to wiring (not shown) arranged at an end portion of a film, and the wiring is connected to a controller IC (not shown). The first and second transparent electrode patterns 10 and 20 as described above can be arranged, for example, in a grid-like form, with one of these patterns serving as x-coordinate electrodes and the other serving as Y-coordinate electrodes. Also, the electrodes of the transparent electrode patterns 10 and 12 may take any shape such as a stripe or a rhombus.

Also, the transparent electrode patterns 10 and 20 are typically formed of a transparent conductor. The transparent conductor is a material having a high transmittance (80% or greater) in the visible light region (380 to 780 nm) and having a surface resistance per unit area (Ω/□: ohms per square) of 500Ω/□ or less. Specifically, it is possible to use, for example, indium tin oxide, indium zinc oxide, or a composite oxide of indium oxide and zinc oxide. When the transparent conductor that forms a transparent electrode pattern is indium tin oxide, the surface resistance of the transparent conductor is preferably 300Ω/□ or less, and more preferably 200 to 300Ω/□. A transparent conductor having such a surface resistance can be obtained by, for example, forming an indium tin oxide film containing 97 wt % of indium oxide and 3.3 wt % of tin oxide on a film having a thickness of 15 to 55 μm and heating the resulting indium tin oxide layer for crystallization. Also, the transparent electrode patterns 10 and 20 each preferably have a height of 10 to 100 nm and more preferably 10 to 50 nm. The transparent electrode patterns 10 and 20 can be formed by various methods. For example, first, a transparent conductor layer is formed on a film by sputtering or vacuum deposition. Then, the formed transparent conductor layer is patterned by etching, thus forming a transparent electrode pattern.

(3) Adhesive Layers

The first and third adhesive layers 11 and 31 are, as described above, layers in which the transparent electrode patterns 10 and 20 are embedded, respectively, and a pressure-sensitive adhesive (also referred to as an "adhesive") can be used. It is preferable that an acrylic adhesive, for example, is used as the pressure-sensitive adhesive. Also, an adhesive suitably selected from commercially available optical clear adhesives (OPAs) can be used. The first adhesive layer 11 preferably has a thickness of, for example, 10 to 50 μm, and the third adhesive layer 31 preferably has a thickness of, for example, 10 to 200 μm. On the other hand, for the second adhesive layer 21, a curable adhesive in addition to a pressure-sensitive adhesive can also be used. When a pressure-sensitive adhesive is used for the second adhesive layer 21, the storage elastic modulus thereof is preferably 0.1 to 10 MPa. With such an elastic modulus, shrink resistance is enhanced, thus making it possible to further reduce waviness. For the pressure-sensitive adhesive, the same material as that described for the first and third adhesive layers 11 and 31 can be used. Also, it is preferable, for example, from the viewpoint of being curable at temperatures that do not adversely affect the laminated film, to use an activation energy radiation curable adhesive for the curable adhesive, and it is more preferable to use a layer formed of a UV curable adhesive. When a layer formed of a pressure-sensitive adhesive is used, the second adhesive layer 21 preferably has a thickness of, for example, 15 to 50 μm, and when a layer formed of a curable adhesive is used, the second adhesive layer 21 preferably has a thickness of, for example, 0.1 to 10 μm.

(4) Cover Lens

The cover lens 4 is disposed on the uppermost surface of the touch panel sensor and used as a protective layer to protect the touch panel sensor from an external impact or friction. The cover lens 4 generally has an input area on which a user performs an input operation by touching the surface thereof and an opaque non-input area formed therearound by decorative printing. The cover lens 4 is formed of a material such as plastic or glass, and the thickness thereof may be, for example, 0.5 to 1.5 mm.

Next, an example of a method for manufacturing the above-described touch panel sensor will now be described. First, a transparent conductor layer is formed on the upper surface of the third film 3. Next, the second adhesive layer 21 is applied to the lower surface of the third film 3, and the second film 2 is laminated via the adhesive layer 21. Then, the transparent electric conductor layer on the third film 3 is etched to form the second transparent electrode pattern 20, for example, in a stripe form. Thereafter, the third adhesive layer 31 is applied to the upper surface of the third film 3 such that the second transparent electrode pattern 20 is embedded therein, and the cover lens 4 is disposed via the adhesive 31. In parallel with this, a transparent conductor layer is laminated on the upper surface of the first film 1 and etched to form the first transparent electrode pattern 10, for example, in a stripe form on the first film 1. Note that this striped pattern intersects the second transparent electrode pattern 20. Thereafter, the first adhesive layer 11 is applied to the upper surface of the first film 1 on which the transparent electrode pattern 10 has been formed such that the first transparent electrode pattern 10 is embedded therein, and then attached to the lower surface of the second film 2. The touch panel sensor thus completed is suitably used in various applications, and can be used for, for example, smartphones, tablet terminals (also referred to as "Slate PCs"), and the like. In such cases, wiring is suitably connected to both the transparent electrode patterns 10 and 20 and disposed on the display.

The touch panel sensor configured as described above is used as follows. That is, when any location on the cover lens 4 is touched with a finger, the capacitance at that location between the first transparent electrode pattern 10 and the second transparent electrode pattern 20 changes. That is, the capacitance between stripes of the respective patterns changes, thus making it possible to determine that the intersection of the stripes with changed capacitance is the location of the touch.

As described above, according to this embodiment, the third film 3 on which the second transparent electrode pattern 20 is laminated is supported by the second film 2 via the second adhesive layer 21, and therefore, even when the thickness of the third film 3 is small, waviness generated during the formation of the transparent electrode pattern 20 can be small. Also, because Da/Db is 0.5 to 0.9 where Da is the total thickness of the second film 2 and the second adhesive layer 21 and Db is the distance between the first transparent electrode pattern 10 and the second transparent electrode pattern 20, the distance Db can be suitably maintained even when the thickness of the third film 3 is small, thus making it possible to enhance the touch sensitivity of the touch panel sensor. As a result, waviness reduction and touch sensitivity enhancement can be achieved.

An embodiment of the present invention has been described above, but the present invention is not limited to the above-described embodiment, and various changes can be made without departing from the gist of the present invention. For example, in addition to being in a stripe form, the transparent electrode pattern may take various other forms according to the required function or performance.

EXAMPLE

Hereinbelow, examples of the present invention will now be described. However, the present invention is not limited to the following examples. Below, three examples having the configuration presented in the foregoing embodiment and a comparative example having neither a second film nor a second adhesive layer were prepared.

(1) Example 1

A sputtering system provided with a sintered target containing 97 wt % of indium oxide and 3.3 wt % of tin oxide was prepared. Next, an indium tin oxide layer having a thickness of 27 nm was formed on a third film having a thickness of 25 μm composed of polyethylene terephthalate using the sputtering system. Then, the indium tin oxide layer was heat-treated for 30 minutes in a heating oven at 140° C. for crystallization. The surface resistance of the resulting indium tin oxide layer measured according to a four-terminal method was 270Ω/□, and thus the indium tin oxide layer exhibited excellent electrical conductivity.

Next, a second adhesive layer having a thickness of 25 μm composed of an acrylic adhesive was laminated on the surface opposite the indium tin oxide layer of the third film. Then, a second film having a thickness of 125 μm composed of polyethylene terephthalate was laminated on the third film via the second adhesive layer. Next, a photoresist having a stripe pattern was formed on the surface of the indium tin oxide layer, and immersed in hydrochloric acid for etching. Then, drying was performed at 120° C. for 5 minutes, giving a second transparent electrode pattern in a stripe form having a height of 27 nm, a width of 2 mm, and a pitch of 6 mm.

Next, a third adhesive layer having a thickness of 100 μm composed of an acrylic adhesive was applied to the third film on the same side that the second transparent electrode pattern was formed such that the transparent electrode pattern was embedded therein, and a cover lens was laminated via the third adhesive layer.

In parallel with the above-described process, an indium tin oxide layer was formed on a first film composed of polyethylene terephthalate in the same manner as the third film. Then, indium tin oxide was etched according to the same method as used above, giving a first transparent electrode pattern. Note that the first transparent electrode pattern was formed such that the stripes intersected the stripes of the second transparent electrode pattern. Next, a first adhesive layer having a thickness of 25 μm composed of an acrylic adhesive was applied to the first film such that the first transparent electrode pattern was embedded therein. The first adhesive layer was adhered to the lower surface of the second film, i.e., the side opposite the surface on which the second adhesive layer had been laminated.

Regarding the touch panel sensor obtained in this manner, the total thickness Da of the second film and the second adhesive layer was 150 μm and the distance Db between the first transparent electrode pattern and the second transparent electrode pattern was 200 μm. Therefore, Da/Db was 0.75. Note that this Da and Db and the thickness of each member were measured using a film thickness meter (Peacock digital dial gauge DG-205).

(2) Example 2

A touch panel sensor was prepared in the same manner as in Example 1 except that the thickness of the second film was different from Example 1. The thickness of the second film was 100 μm. Therefore, Da was 125 μm, Db was 175 μm, and Da/Db was 0.71.

(3) Example 3

A touch panel sensor was prepared in the same manner as in Example 1 except that the thickness of the second film was different from Example 1. The thickness of the second film was 50 μm. Therefore, Da was 75 μm, Db was 125 μm, and Da/Db was 0.6.

(4) Comparative Example

The difference from Example 1 is that neither a second film nor a second adhesive was provided. In the manufacturing method, an indium tin oxide layer was formed on a third film and then etched without a second film being laminated, thus giving a second transparent electrode pattern. Thereafter, a first film on which a first transparent electrode pattern had been formed was laminated on the lower surface of the third film via a first adhesive layer. Therefore, Da was 0 μm, Db was 50 μm, and Da/Db was 0.

(5) Waviness Measurement

Figure 2:
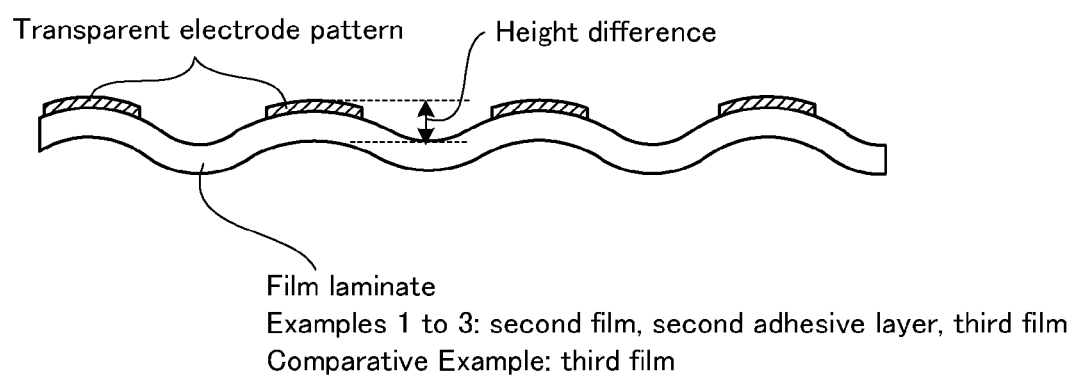
FIG. 2 is a schematic view showing waviness measurement performed in the examples.

In the examples and comparative example above, waviness was measured when the second transparent electrode pattern was formed. That is, for Examples 1 to 3, a film laminate formed of a second transparent electrode pattern, second and third films, and a second adhesive layer, and for the comparative example, a film laminate formed of a second transparent electrode pattern and a third film were placed on a flat table, and as shown in FIG. 2, the height difference between a portion with a transparent electrode pattern and a portion without was measured using an optical profilometer (Optical Profilometer NT3300 manufactured by Veeco Instruments Inc.). Results are as presented below.

TABLE 1

|  | Da (μm) | Db (μm) | Da/Db | Height difference (μm) |
| --- | --- | --- | --- | --- |
| Ex. 1 | 150 | 200 | 0.75 | 0.2 |
| Ex. 2 | 125 | 175 | 0.71 | 0.3 |
| Ex. 3 | 75 | 125 | 0.6 | 0.5 |
| Comp. Ex. 1 | 0 | 50 | 0 | 1.5 |

It can be understood from Examples 1 to 3 above that the greater the Da, the more firmly supported the third film that had a small thickness was, and thus the height difference was ⅓ the comparative example or less. Also, the greater the Da, the greater the Db, and therefore, the distance between the transparent electrode patterns was also increased. Accordingly, it can be understood that the degree of the capacity change brought about when a finger touches the cover lens is increased, making it possible to enhance touch sensitivity. In Examples 1 to 3, Da/Db determined by Da and Db was within the aforementioned 0.5 to 0.9 range, and it can be understood that waviness reduction and touch sensitivity enhancement can be simultaneously achieved.

The invention claimed is:

1. A touch panel sensor comprising:
    a first film,
    a first transparent electrode pattern formed on the first film,
    a first adhesive layer laminated on the first film so as to cover the first transparent electrode pattern,
    a second film laminated on the first adhesive layer,
    a second adhesive layer laminated on the second film,
    a third film laminated on the second adhesive layer, and
    a second transparent electrode pattern formed on the third film,
    wherein Da/Db is 0.5 to 0.9 where a total thickness of the second film and the second adhesive layer is Da, and a distance between the first transparent electrode pattern and the second transparent electrode pattern is Db.

2. The touch panel sensor according to claim 1, wherein Da is 50 to 240 μm.

3. The touch panel sensor according to claim 1, wherein Db is 100 to 300 μm.

4. The touch panel sensor according to claim 2, wherein Db is 100 to 300 μm.

5. The touch panel sensor according to claim 1, further comprising:
    a third adhesive layer laminated on the third film so as to cover the second transparent electrode pattern, and
    a protective layer laminated on the third adhesive layer.

6. The touch panel sensor according to claim 2, further comprising:
    a third adhesive layer laminated on the third film so as to cover the second transparent electrode pattern, and
    a protective layer laminated on the third adhesive layer.

7. The touch panel sensor according to claim 3, further comprising:
    a third adhesive layer laminated on the third film so as to cover the second transparent electrode pattern, and
    a protective layer laminated on the third adhesive layer.

* * * * *